(No Model.)
A. MANVERS & M. FINK.
PUNCTURE RESISTING SHIELD FOR PNEUMATIC TIRES.
No. 590,996. Patented Oct. 5, 1897.
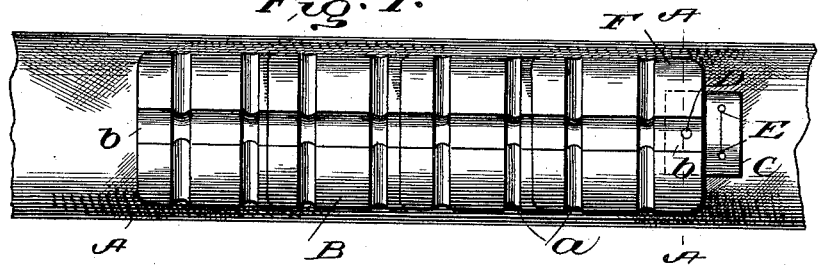
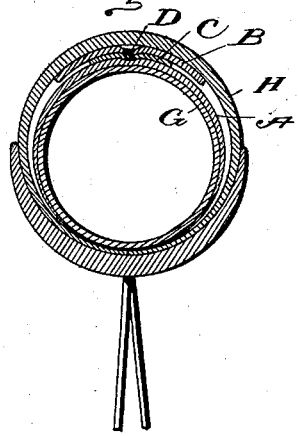
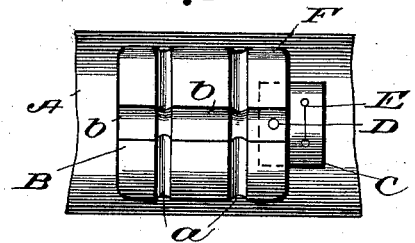
Witnesses
Inventors
Albert Manvers
Marc Fink
by Alexander F. Dowell
Their Attorneys

UNITED STATES PATENT OFFICE.

ALBERT MANVERS, OF NORTHCOTE, AND MARC FINK, OF ST. KILDA, VICTORIA.

PUNCTURE-RESISTING SHIELD FOR PNEUMATIC TIRES.

SPECIFICATION forming part of Letters Patent No. 590,996, dated October 5, 1897.

Application filed April 12, 1897. Serial No. 631,828. (No model.)

*To all whom it may concern:*

Be it known that we, ALBERT MANVERS, engineer, residing at Mary Street, Northcote, and MARC FINK, engineer, residing at Argyle Street, St. Kilda, near Melbourne, in the Colony of Victoria, have invented a new and useful Improvement in Pneumatic Tires, of which the following is a specification.

Our invention relates to means for preventing the bladder of a pneumatic tire from being punctured. For this purpose we fix on that bladder, between it and the cover, an elastic belt having attached to it a number of metallic shield-plates overlapping each other like tiles, as we shall describe, referring to the accompanying drawings.

Figure 1 is a plan of part of the shield. Fig. 2 is a transverse section of the tire and rim on the line A A of Fig. 1. Fig. 3 is a section, and Fig. 4 is a plan, of one of the shield-plates connected to the leather tag.

A is an elastic flexible belt; B, a curved plate of metal, preferably aluminium.

C is a leather tag.

D is a metal eyelet connecting the plate B to the tag C.

E is stitching securing the tag C to the belt A, for which stitching an eyelet-fastening may be substituted.

F is the depressed end part of the plate B, on which the end part of the next plate seats, each plate thus overlapping the one in front of it. The plates are stiffened by transverse furrows $a$ and longitudinal furrows $b$.

G is the bladder, and H the cover. The belt A is made slightly less in circumference than the fully-inflated bladder. After the shield-plates are attached to the belt it is placed on the bladder before inflation, and the cover H is fixed in any known manner. The bladder is then inflated, tightening the belt, shield, and cover upon it.

Each of the plates B being fastened to the belt at one end only, when it is released from the tread-pressure tends to spring off the next plate, and thus throws off or resists any sharp point that may penetrate the cover.

Having thus described the nature of this invention and the best means we know for carrying the same into practical effect, we claim—

The herein-described shield for protecting the bladder of a pneumatic tire from puncture, consisting of a series of overlapping longitudinally and transversely furrowed metallic plates, an elastic belt, and leather tags connecting the plates to said belt, the whole adapted to be placed between the bladder and the cover of the tire, and constructed substantially as and for the purpose described.

In testimony whereof we have signed our names to this specification in the presence of two subscribing witnesses.

ALBERT MANVERS.
MARC FINK.

Witnesses:
JONATHAN BEAR,
JAS. HINGSTON.